Patented Oct. 3, 1922.

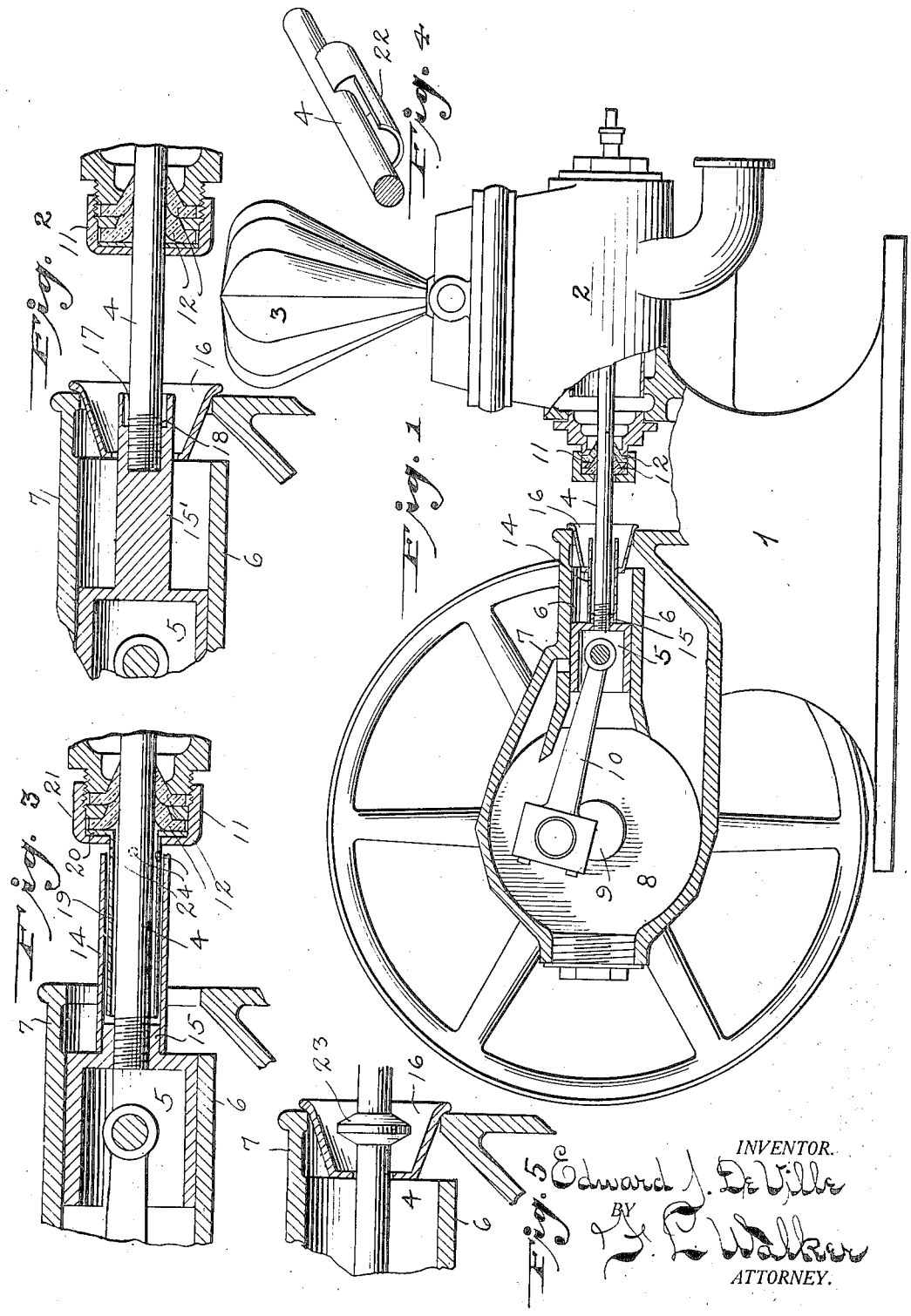

1,430,956

UNITED STATES PATENT OFFICE.

EDWARD J. DE VILLE, OF DAYTON, OHIO, ASSIGNOR TO THE MONARCH ENGINEERING COMPANY, OF DAYTON, OHIO, A CORPORATION OF OHIO.

SEEPAGE INTERCEPTOR FOR PISTON RODS.

Application filed January 10, 1921. Serial No. 436,179.

*To all whom it may concern:*

Be it known that I, EDWARD J. DE VILLE, a citizen of the United States, residing at Dayton, in the county of Montgomery and State of Ohio, have invented certain new and useful Improvements in Seepage Interceptors for Piston Rods, of which the following is a specification.

My invention relates to pumps, compressors, engines and other like apparatus, employing reciprocatory piston rods, and more particularly to moisture collecting means for intercepting the moisture which leaks from the cylinder of such apparatus, and tends to follow the piston rod from which it drips upon the cross head bearings or finds its way into the crank case or oil reservoir.

It is quite the common practice to employ the crank case of a horizontal reciprocatory pump, engine or compressor, as a reservoir for lubricant. Even with the greatest precaution, there will be in most instances some seepage from the cylinder of the apparatus through the usual packing gland. The seepage water, condensed steam, or other liquid collects in drops on the under side of the piston rod, which it follows rearwardly and is deposited within the cross head housing, where it mixes with the lubricant of the cross head and finds its way into the crank case reservoir, destroying the lubricating qualities of the oil, and causing corrosion and rust of the bearings.

The present invention is designed to intercept the travel of such moisture deposits upon piston rod and prevent their entrance into the crank case housing or the cross head bearing by insuring their discharge at a point beyond the entrance to such housing.

A further object of the invention is to provide a form of device which will minimize the leakage through the piston rod packing gland, by developing an intermittent external pressure upon such gland, which will check the seepage or leakage of fluid therethrough.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Fig. 1 is a side elevation, partly in section of a pump, to which the present invention has been applied. Fig. 2 is a detail enlarged sectional view of a modification of the construction shown in Fig. 1. Fig. 3 is a similar view of a modification and further development of the constructions shown in Figs. 1 and 2 by which external pressure is developed to check the seepage or leakage through the piston rod packing gland. Figs. 4 and 5 illustrate further modifications of the interceptor.

Like parts are indicated by similar reference characters throughout the several views.

While in Fig. 1 of the drawings, the invention has been shown applied to a reciprocatory pump, it is to be understood that this application of the invention is for illustrative purposes only, and that the invention is not limited alone to pumps, but is applicable to any horizontal piston rod, where difficulty is experienced from the collection of moisture. In the drawing, 1 is the base of the pump of which 2 is the cylinder and 3 the air chamber. Within the cylinder 2 is the usual reciprocatory piston to which is connected the piston rod 4, supported at its rearward end by the reciprocatory cross head 5, slidingly mounted in suitable cross head bearings, or guides 6. These guides or bearings 6 are contained within the cross head housing 7, contiguous to and communicating with a crank case 8, which ordinarily contains a generous supply of lubricant, agitated and distributed by the rotation of the crank 9, which carries the pitman 10 connecting the crank with the cross head. The piston rod 4 reciprocates to and fro through a packing gland 11, at the entrance to the cylinder 2. Various types of packing glands have been devised to check the seepage or leakage of steam or water from the cylinder. In the present instance, there has been shown a packing gland embodying two concentric foolscap packing members 12, one positioned within the other, and tending to contract upon the piston rod under the influence of internal pressure within the cylinder. With the best type of packing gland, there will be some escape of steam or moisture, and in the case of pumps, there is sometimes condensation moisture from the atmosphere upon the cold piston rod. This moisture collects in the form of drops on the underside of the rod, and follows the rod by capillary attraction dripping therefrom within the housing 7, unless precaution is taken, as in the present instance, to intercept these drops of moisture and effect their discharge outside the cross head housing.

As a simple and convenient means of intercepting such moisture deposits, there has been shown in Fig. 1, a tubular sleeve 14, surrounding the piston rod 4 in spaced relation therewith, and for convenience, mounted upon the hub 15 of the cross head 5. This construction affords convenient and simple mode of applying the invention to existing pumps and engines. Positioned in the entrance to the cross head housing 7 is a tapered thimble or bushing 16, having in the inner end thereof an opening through which the piston rod and concentric sleeve extends. This thimble 16 extends slightly beyond the wall of the cross head housing 7 and is provided with a flared or belled margin. The sleeve 14 is of such length as to project beyond the entrance opening through the inner end of the thimble 16 to the cross head housing 7, when the piston rod and cross head are in their retracted position. The drops of moisture following the piston rod enter within the open outer end of the sleeve 14, and the drip from the piston rod is collected by such sleeve, and conducted beyond the outer end of the cross head housing 7. In the retracted position of the piston rod and cross head, this moisture will be discharged within the tapered thimble, which due to its tapered configuration, drains the deposit of moisture outwardly, where it will drip from the flared marginal flange beyond the wall of the housing 7.

In Fig. 2 there is shown a modification of this construction, in which the hub of the cross head 5 is extended as at 15' to such length as to project beyond the entrance to the cross head housing 7, when the cross head and piston rod are in their retracted position. The end of this extended hub 15' is counter-bored at 17 to receive the piston rod 4. The counter-bore of the end of the hub 15' provides an annular recess 18 about the piston rod 4, at the extremity of the hub 15', in which the collected moisture is deposited and from which it drips into the outwardly tapered thimble 16. The effect and action is the same as in Fig. 1. In Fig. 3 there is shown the same construction as disclosed in Fig. 1, to which is added a stationary tube 19, connected with the packing gland 12 and having telescopic relation with the tubular sleeve 14, within which it extends. The sleeve or tube 19 possesses a somewhat larger internal diameter than the diameter of the piston rod, whereby there is afforded a clearance about the piston rod. In actual practice this clearance is approximately one sixty-fourth to one thirty-second of an inch. The sleeve or tube 19 fits quite loosely within the sleeve 14 having an intermediate clearance space of commensurate proportion. In practice in a small pump construction, wherein the internal clearance of the tube 19 is approximately a sixty-fourth to a thirty-second of an inch, the clearance between the tubes 19 and 14 will be approximately five one thousandths of an inch. These dimensions are suggested merely for illustrative purposes, and are not intended nor to be construed as limitations. It is to be understood that these proportions or dimensions may be varied in accordance with the conditions of use and the difficulty to be overcome.

The tube 19 may be connected in any way to the cylinder or packing gland. In the present instance, it has been shown provided with a terminal peripheral flange 20, which is clamped within the cap 21 of the packing gland 12. It is obvious that this tube might be formed integral with the cap 21, or other method of support provided. As the piston rod is reciprocated, the tubes 14 and 19 have a to and fro telescopic movement in relation one with the other. As the tubes are drawn apart upon the retrograde movement of the piston rod and cross head, a charge of air is drawn into the interior through the clearance space between the tubes 14 and 19. Upon the return stroke of the piston rod, this charge of air is compressed within the tube 19. The charge of air will of course escape through the same clearance space through which it entered. In the meantime, however, the compression of the charge of air within the tube will have exerted an external pressure upon the packing gland 12, which will serve to retard or arrest the escape of steam, gas or water. In the event that such moisture does escape, it must follow the piston rearwardly and be deposited within the concentric tube, finally draining from the open end of the tube 14, at a point outside the entrance to the cross head housing, just as described in connection with Fig. 1. In fact Fig. 3 differs from Figs. 1 and 2 only in the addition of the sleeve 19, which affords a compression cylinder for air, developing external pressure upon the packing gland. With the exception of the pressure operated means shown in Fig. 3, the moisture intercepting means need not extend entirely around the piston rod 4. In lieu of the concentric tubular sleeve shown in Fig. 1, or the recessed hub shown in Fig. 2, the piston rod may be provided with a channelled gutter or conductor 22 shown in Fig. 4, which may be of greater or less length, and mounted directly upon the piston rod in such position as to extend beyond the entrance to the cross head housing 7 when the piston rod is in its retracted position. In lieu of either of these constructions, the piston rod may be provided with a collar or enlargement 23, shown in Fig. 5, so positioned upon the piston rod as to be without the entrance to the cross head housing when the piston rod is retracted. Drops of moisture following the piston rod in this instance, meeting the collar will descend to the lower peripheral edge of the collar 23. Capillary attraction being insufficient to carry these drops of miosture upward on the opposite side of the collar, the progress of the moisture drops will be arrested and the moisture will drip from the collar 23 outside the cross head housing 7. By extending the housing thimble 16 somewhat beyond the wall of the housing 7, and deflecting its marginal edge outwardly, there will not be the tendency to collect or hold moisture as would be the case if such thimble terminated abruptly at the wall of the housing 7.

The construction shown in Fig. 3 may be utilized to supply compressed air to the distribution system by forcing small charges of air into the cylinder through the packing gland by the telescopic action of the tubes 14 and 19. In lieu of such action, the inner tube 19 may be provided with one or more small holes 24 adjacent to the packing gland, through which the entrapped air will be discharged at each reciprocation of the piston rod carrying with it any moisture which may have collected within the tubes.

In addition to its function of repelling seepage water as hereinbefore described, the construction shown in Fig. 3 has the further advantage of protecting the piston rod against injury and deposit of grit or foreign material. The piston rods being customarily formed of brass are easily marred or roughened as when a wrench used in tightening the packing gland may slip off the gland and dent the rod. Such dent or injury affords a rough spot which in the continued to and fro operation of the piston rod wears upon the packing and induces leakage. The same thing is true of grit, dust or dirt which may lodge upon the piston rod and afford an abrasive action upon the packing members 12, causing them to become unduly worn and cause leakage. By enclosing the piston rod in the protective tubes, such difficulty is overcome.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a construction of the character described, a reciprocatory piston rod, a cross head and a cross head housing, of a sleeve surrounding the piston rod in spaced relation and moving therewith, said sleeve being of such length as to extend to the exterior of the cross head housing when the piston rod and cross head are in retracted position.

2. The combination with a reciprocatory piston rod, a cross head, and cross head housing of a moisture interceptor comprising a drip receiver movable to and fro with the piston rod and terminating at a point outside the entrance to the cross head housing when the rod is in its retracted position.

3. The combination with a reciprocatory piston rod, a cross head and a cross head housing, of a moisture receiving channel beneath the piston rod, closed at its end adjacent to the cross head and open at its opposite end, said channel member being mounted for movement with the piston rod in such relation therewith that its open or discharge end projects outside the entrance to the cross head housing when the piston rod is in its retracted position.

4. The combination with a reciprocatory piston rod, a cross head and a cross head housing, of a laterally recessed shoulder carried by the piston rod extending to a point outside the entrance to the cross head housing when the piston rod is in retracted position.

5. The combination with a reciprocatory piston rod, or a pair of telescopic tubes surrounding the piston rod, one of said tubes being stationarily mounted and the other tube being movable with the piston rod.

6. The combination with a reciprocatory piston rod and a gland through which the rod reciprocates of a pair of relatively movable telescopic tubes surrounding the piston rod, one of said tubes communicating with the gland, the other tube being closed at its outer end and movable with the piston rod.

7. The combination with a reciprocatory piston rod and a gland through which the piston rod reciprocates of air compressing means actuated by the reciprocation of the piston rod and communicating with the gland.

8. The combination with a reciprocatory piston rod, a cross head and cross head housing of a tapered cup like bushing inserted in the entrance to the cross head housing and surrounding the piston rod, the margin of the said bushing extending beyond the cross head housing and overhanging the wall thereof, and a moisture collecting conduit extending beneath the piston rod and discharging into said tapered cup like bushing when the piston rod is in its retracted position.

9. The combination with a reciprocatory piston rod of a receiving chamber for moisture collected by the piston rod, and means for creating pressure within said chamber by the reciprocation of the piston rod, whereby collected moisture will be discharged therefrom.

10. The combination with a reciprocatory piston rod, a cross head, and a cross head housing of a drip arrester for the piston rod comprising an enlargement carried thereby and so positioned in relation therewith as to extend outside the cross head housing when the rod is in its retracted position.

11. The combination with a horizontally disposed cylinder, a cross head housing and a piston rod, of an offset upon the piston rod interrupting the continuity of capillary attraction of seepage water from the cylinder along the under side of the rod, said offset being so positioned upon the piston rod that the drip of seepage water from said intercepting offset will be directed outside the cross head housing when the piston rod is at the limit of its retractive movement.

12. The combination with a horizontally disposed cylinder, and a cross head housing of a reciprocatory piston rod having portions of different diameter to form an offset in the piston rod at a point outside the cross head housing when the rod is at the limit of its retractive movement to intercept the capillary flow of seepage water and condensation upon the piston rod and induce the dripping of such moisture outside the cross head housing.

13. The combination with a horizontally disposed cylinder, a cross head housing and a reciprocatory piston rod of a seepage arrestor means carried upon and movable to and fro with the piston rod and discharging the drip of moisture from the piston rod at a point outside the cross head housing when the rod is at the limit of its retractive movement.

14. In a construction of the character described, the combination with a cylinder, a reciprocatory piston rod and a packing gland surrounding the piston rod at its entrance to the cylinder, of means for subjecting the packing gland to external fluid pressure to resist the escape of fluid from the interior of the cylinder through the packing gland.

In testimony whereof, I have hereunto set my hand this 8th day of December, A. D. 1920.

EDWARD J. DE VILLE.

Witnesses:
F. A. WAGNER,
H. M. DE WITT.